March 12, 1968  L. L. MESLER  3,372,665
CABLE DISPENSING AND SECURING DEVICE
Filed Sept. 20, 1966
4 Sheets-Sheet 1
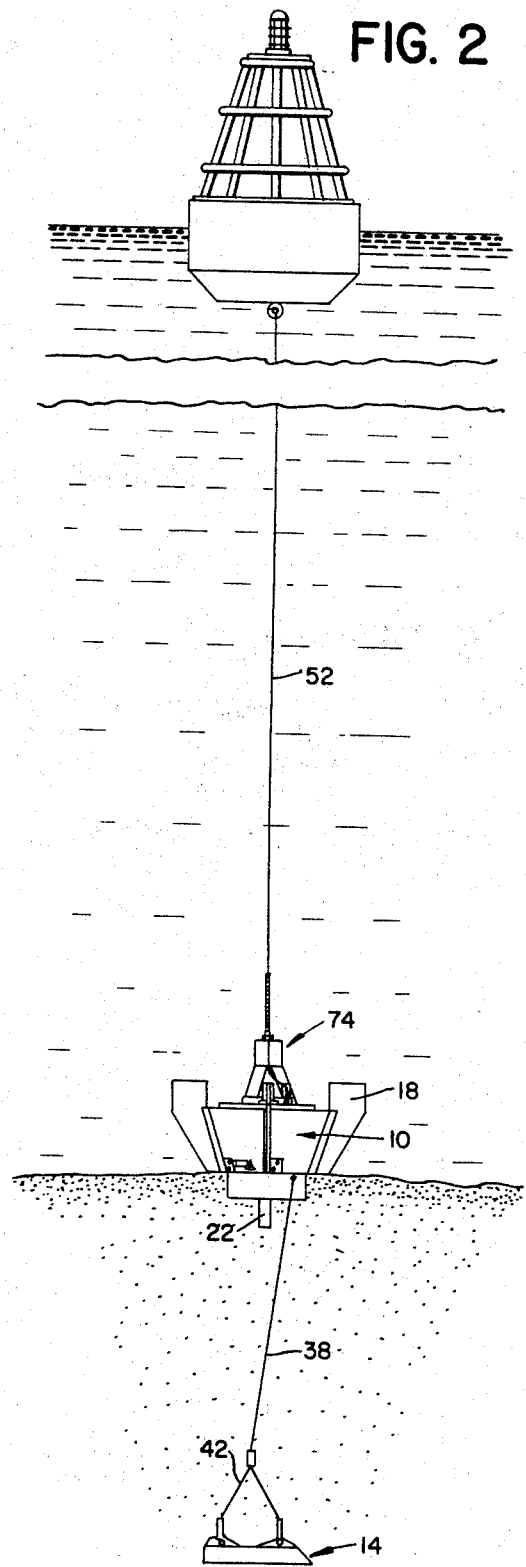
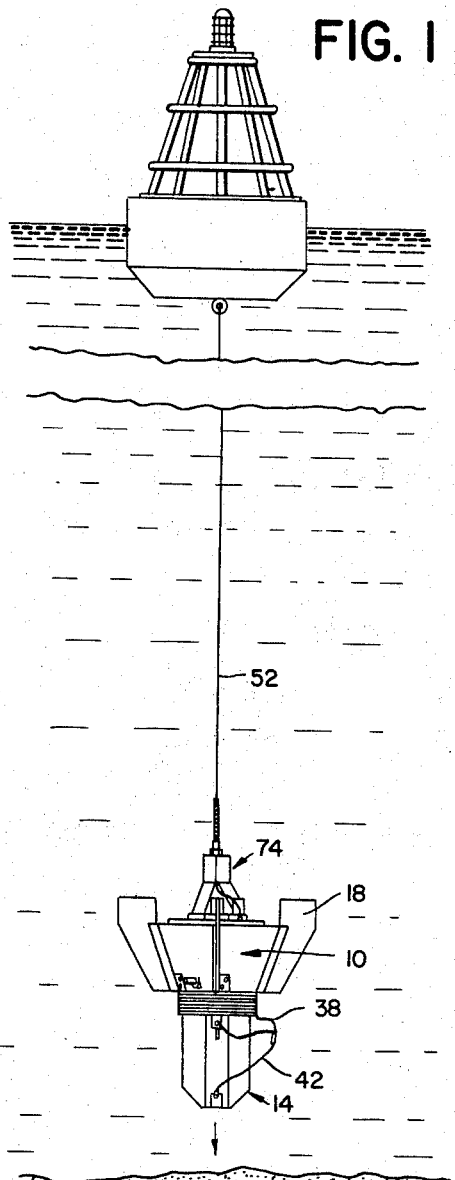
INVENTOR.
LILBURN L. MESLER
BY
ATTORNEYS

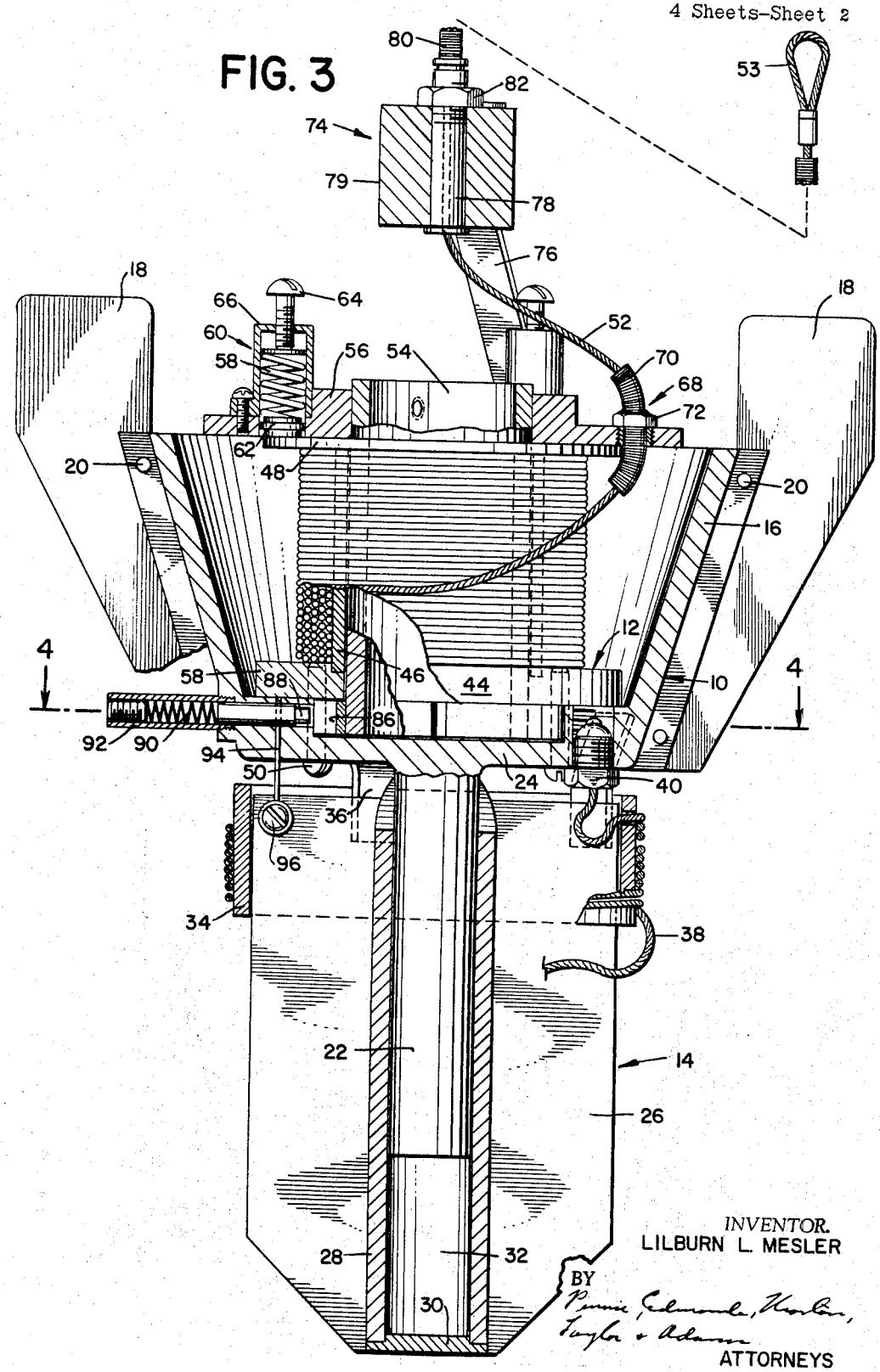

March 12, 1968     L. L. MESLER     3,372,665

CABLE DISPENSING AND SECURING DEVICE

Filed Sept. 20, 1966     4 Sheets-Sheet 3

INVENTOR.
LILBURN L. MESLER

BY

ATTORNEYS

March 12, 1968 L. L. MESLER 3,372,665
CABLE DISPENSING AND SECURING DEVICE
Filed Sept. 20, 1966 4 Sheets-Sheet 4

INVENTOR
LILBURN L. MESLER
BY Pennie, Edmonds, Morton
Taylor and Adams
ATTORNEYS United States Patent Office 3,372,665
Patented Mar. 12, 1968

3,372,665
CABLE DISPENSING AND SECURING DEVICE
Lilburn L. Mesler, Palmyra, Mich., assignor to American Chain & Cable Company, Inc., New York, N.Y., a corporation of New York
Continuation-in-part of application Ser. No. 392,560, Aug. 27, 1964. This application Sept. 20, 1966, Ser. No. 593,251
15 Claims. (Cl. 114—206)

This application is a continuation-in-part of Ser. No. 392,560, filed Aug. 27, 1964.

This invention relates to devices for dispensing and securing cable and, more particularly, to a device wherein the cable is paid out from the end of a reel through a rotatable flyer and is secured by positive locking means which prevent further rotation of the flyer.

One of the principal uses to which the device of the invention is particularly adapted is in the mooring of buoys at a given station on a body of water. It has many applications beyond that specific purpose, however, all of which are apparent from the following descriptions of specific embodiments of the invention. With respect to the stationing of buoys, it is important that once they are located they be kept in position with minimum drift. This is particularly true of navigational buoys and also marker buoys used in rescue work and in oceanographic exploration. Conventional mooring devices do not provide a highly accurate means for stationing a buoy because the vertical distance between the buoy and the bottom of the body of water is often much less than the paid out length of the mooring cable. The result is that the buoy drifts away from a station directly above the anchoring point of the cable. One of the reasons for this excess length of the mooring cable is that the cable is often paid out after the anchor reaches the bottom of the body of water and slack is thus created which produces an arc in the mooring cable from the anchor to the surface. It follows that the buoy on the surface may actually be located at some point on a circle about the anchor rather than directly over the anchor itself.

Broadly stated, the device provided by the invention for dispensing and securing cable comprises a main body portion and a flyer rotatable on the body portion. A reel is affixed to the body portion coaxial with the flyer. Wrapped about the reel is a length of cable to be paid out from the end of the reel through the flyer to impart rotation to the flyer. Locking means are provided for preventing rotation of the flyer and pay out of the cable and includes positively engageable first and second locking elements mounted on the flyer and body portion respectively and biased toward locked position. The locking means further includes restraining means releasably holding the locking elements out of locked position and triggering means for disabling the restraining means to release the locking elements into locked position and prevent rotation of the flyer.

When used with a mooring cable to station a buoy, the cable is secured on the surface of the body of water and the remainder of the device is adapted to be submerged downwardly therefrom. In one embodiment of the invention, the locking elements comprise a spring-biased pin on the body portion and a disc on the flyer defining sockets in which said pin is positively engageable. The restraining means releasably holds the spring-biased pin, and the triggering means is operative to disable the restraining means in response to impact on the bottom of water by anchor means secured to the body portion.

In another embodiment of the invention, the first locking element on the flyer is biased toward the second locking element. Eccentric means are mounted on the flyer for limited displacement with respect to the axis of rotation thereof, and biasing means act upon this eccentric means. The eccentric means is urged by centrifugal force during rotation of the flyer into connected relation with the first locking element to hold the locking elements in unlocked position. Upon cessation of rotation of the flyer, the eccentric means is urged by the biasing means into disconnected relation with the first locking element to release the locking element into locked position.

By the foregoing constructions, it is possible to cease pay out of the cable very sharply simply by triggering the locking means which prevents further rotation of the flyer. When applied to a mooring buoy, the triggering means may be actuated to lock the flyer in response either to impact of the anchor on the bottom of the body of water or simply to the cessation of rotation of the flyer which occurs at that time. In either case, excessive slack is not introduced into the mooring cable and the buoy is accurately located at a station directly above the anchor. Many analogous uses in a number of areas other than marine installations will be equally evident.

Preferred embodiments of the invention are described hereinbelow with reference to the accompanying drawings, wherein FIG. 1 is a schematic showing a buoy floating upon the ocean surface and the mooring device descending vertically in the water below it;

FIG. 2 is a schematic like FIG. 1 showing the mooring device in its anchored position in the ocean floor;

FIG. 3 is a partial sectional elevation of the mooring device;

Figure 4:
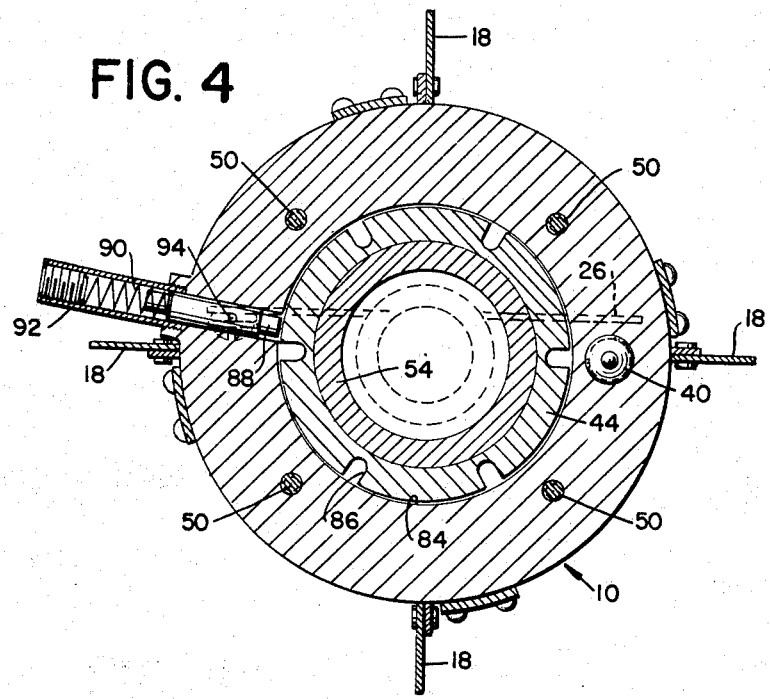
FIG. 4 is a section of the mooring device taken through line 4—4 of FIG. 3.
Figure 5:
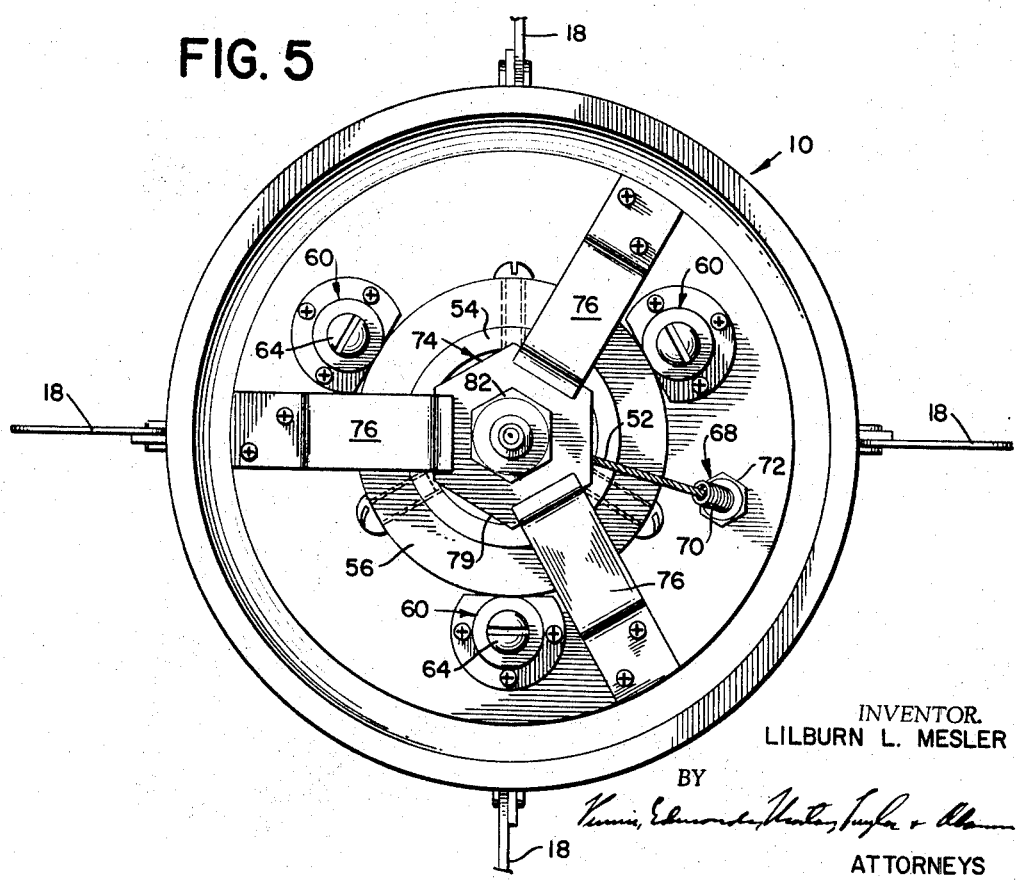
FIG. 5 is a plan view of the mooring device.
Figure 6:
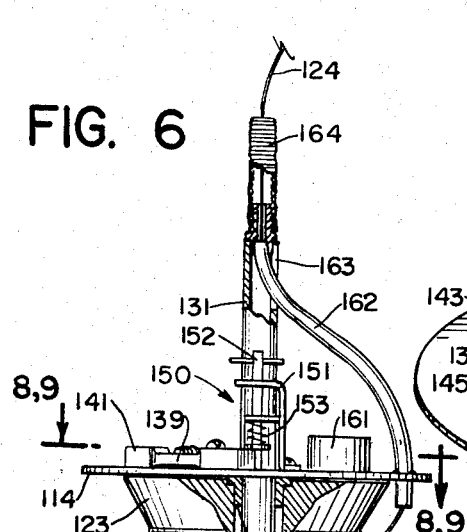
FIG. 6 is a partial sectional elevation of a second embodiment of the mooring device.
Figure 7:
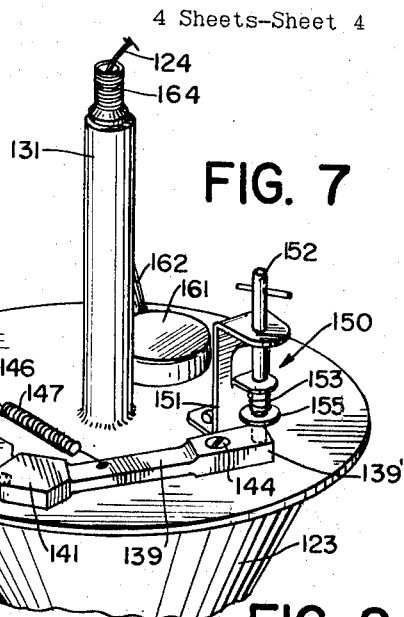
FIG. 7 is a perspective view of the flyer and locking mechanism of the second embodiment of the mooring device.

Referring to FIG. 3, the mooring device comprises three major members, a main body portion 10, a mooring cable storage reel 12, and an anchor member 14. Each of the three major members and related parts are described in detail below.

The main body portion 10 is of generally bowl-shaped configuration having upwardly diverging sides 16. This configuration of the main body portion 10 aids in stabilizing the descent of the mooring device. Because the narrower end of the main body portion faces downwardly in the direction of movement, the tendency of the device to tumble during descent is decreased. In addition, the presence of the anchor member 14 below the main body portion 10 lowers the center of gravity of the mooring device and thus also aids in stabilization.

The main body portion 10 is provided with a plurality of vertical fins 18. The fins 18 are secured to the sides 16 of the main body portion 10 by any suitable means such as rivets 20. The fins 18 act to prevent rotation of the mooring device about its vertical axis during descent through the water and also to prevent tumbling.

Stabilization of the mooring device against rotation and tumbling insures rapid and direct descent of the device through the water. Further, it maintains the anchor member 14 in its proper position for contact with the ocean bottom. Also, as will be described later, proper and efficient unwinding of the mooring cable is permitted.

A stud 22 protrudes from the bottom 24 of the main body portion 10. The stud 22 is centrally located upon the bottom 24 and acts as a support for the anchor member 14. The anchor member 14 comprises a spade 26 and a central tube 28. The tube 28 is adapted to fit in sliding engagement over the stud 22. The lower end 30 of the tub 28 is sealed.

The stud 22 is shorter than tube 28, thereby providing a space between the stud end and the sealed end 30 of the tube. In this space is located an explosive charge 32 which detonates upon contact of the spade 26 with the ocean floor. Preferably, the means for detonating the charge 32 is an explosive cap (not shown) which explodes upon impact. The force of the detonation of the charge 32 drives the anchor member 14 into the ocean floor (see FIG. 2). An anchor cable reel 34 is secured by brackets 36 to the bottom of the main body portion 10. The anchor cable reel 34 is cylindrically shaped and surrounds the upper portion of the anchor spade 26 but does not engage it. An anchor cable 38 is wound about the periphery of the reel 34 and is secured at its one end to the anchor member 14 and at its other end to the main body portion 10.

The length of the anchor cable 38 is measured to insure that all the cable is pulled off the anchor cable reel 34 when the anchor member 14 is driven into the ocean bottom. Thus, no slack anchor cable remains to permit dislogement of the main body portion 10 from its anchored position on the ocean floor. Further, the anchor cable 38 is wound upon the reel 34 in such a manner that there is no entanglement as it is pulled off.

The anchor cable 38 is preferably secured at its one end to the main body portion 10 by a cap nut 40 tightened over the expanded end of the cable. The anchor cable 38 is preferably secured at its other end to the central tube 28 of the anchor member 14 by dual cable links 42, best illustrated in FIG. 2. The reason for this dual cable arrangement is that any upward tension on the anchor cable 38 will tend to force the anchor member 14 into the horizontal position shown in FIG. 2, thereby firmly embedding it in the ocean bottom.

The mooring cable storage reel 12 is located inside the bowl of the main body portion 10. The reel 12 is bolted to the main body portion 10 and is immovable with respect to it. The mooring cable storage reel 12 comprises a bottom flange 44, a hollow cylinder portion 46, and a top flange 48. The bottom flange 44 is fastened to the bottom of the main body portion 10 by bolts 50. Stored upon the cylinder portion 46 of the reel 12 is a mooring cable 52 provided with a loop 53 for securing the cable to a buoy or other device.

A rotatable core 54 is positioned within the cylinder portion 46 of the storage reel 12. The rotatable core 54 is dimensioned so that it may rotate freely about its longitudinal axis within the stationary cylinder portion 46. The rotatable core 54 is provided with an upper rotating plate or flyer 56 and a lower locking disc 58.

The rotating plate 56 is slidable upon top flange 48 of the mooring cable storage reel 12. The rotating plate 56 is provided with a plurality of brakes 60. The brakes 60 each comprise a brake disc 62 adapted to be held in pressure contact with the rotating plate 56 by a compression spring 58. The degree of compression is adjustable by means of adjusting bolt 64 set in the brake housing 66.

The rotating plate 56 is also provided with a guide 68 through which the mooring cable 52 runs. The plate guide 68 is secured near the periphery of the rotating plate 56 and preferably comprises a flexible member 70, such as a spring, held on the plate by nut 72.

A central guide means 74 is also located upon the rotating plate 56. The central guide means 74 comprises a plurality of brackets 76 secured at their lower ends to the rotating plate 56. These brackets support a guide tube 78 in a block 79. The guide tube 78 has its longitudinal or principal axis in alignment with the axis of the reel 12. The guide tube 78 also preferably has a flexible extension 80 secured to the block 79 by a nut 82.

The rotating plate 56 and the members associated with it as described above provide means for unwinding the mooring cable 52 from the mooring cable storage reel 12 in a manner which substantially eliminates rotation forces which might impair the stability of the mooring device as it sinks. Cable is not pulled off a rotable reel in a tangential direction, as is conventional practice. Rather, the reel 12 is stationary and the mooring cable 52 is drawn off the reel in a generally axial direction. The axial paying-off of the mooring cable 52 is permitted by the rotatable plate 56 through which the cable is guided. As cable is drawn upwardly through the guide 68 and central guide means 74, the plate 56 and the rotatable core 54 connected therewith, rotate. Thus, any rotational forces created by unwinding the mooring cable 52 are dissipated in rotating the rotating plate 56 and do not act upon the main body portion 10. Therefore, stability of the device is not disturbed.

The guidance of the mooring cable 52 through the central guide means 74 helps prevent imbalance which might result from unwinding the cable. Further, the cable is given a back-twist of one twist per helical convolution so that it is left free of net twist as it is paid out and does not become kinked or snarled. Also, the speed of rotation of the flange 56 is controlled by the brakes 60 and thus aids in the orderly release of cable.

The mooring cable 52 may be drawn off the reel 12 in the manner described only so long as the rotating plate 56 is permitted to rotate. Rotation of the plate 56 ends when the locking disc 44, and the core 54 interconnecting both the plate 56 and the disc 44 cease to rotate.

The locking disc 44, which is best illustrated in FIG. 4, is rotatable within a circular cutout portion 84 of the main body portion 10. The locking disc 44 is provided with a plurality of sockets in the form of slots 86 in its periphery, which slots are adapted to receive an end of a locking pin 88. As recited in the claims hereinafter, the pin 88 is the first locking element on the flyer and the disc 44 with its slots 86 constitutes the second locking element on the body portion. The locking pin 88 is urged toward the locking disc 44 by compression spring 90 set in a sleeve 92. However, locking pin 88 is normally held out of engagement with the slots 86 by restraining means which is the end of a wire 94 run through the main body portion 10 and the locking pin. The other end of the wire 94 secured to the anchor spade 26 by a bolt 96 serves as triggering means.

From the foregoing, it can be seen that the rotation of the locking flange 44 and connected parts is stopped when wire 94 is withdrawn and the spring loaded locking pin 88 permitted to engage one of the slots 86 in the locking flange. It follows that release of the mooring cable 52 also ends.

The mooring device is used to anchor a buoy in the following manner.

The loop 53 at the end of mooring cable 52 is secured to the underside of the buoy. The adjusting bolts 64 are then set to establish the rotation of the rotating plate 56 at a predetermined speed. Such adjustment is made to permit rapid descent of the mooring device in the water without paying off excess mooring cable.

The buoy and the mooring device are then dropped into the ocean at the desired location with the anchor member 14 of the mooring device facing downward. The mooring device then sinks in a substantially vertical line due, principally, to the stabilizing influences of the shape of the main body portion 10 and the fins 18.

As the mooring device sinks the mooring cable 52 is drawn off from the mooring cable storage reel 12 because of the tension upon it from the buoy which remains floating on the water's surface. Lateral forces are exerted upon the rotating plate 56 by the mooring cable 52 which passes through guide 68 set off-center from the rotational axis of the plate. These lateral forces cause the plate 56 to rotate thereby permitting more of the cable 52 to be drawn off the reel 12. Because the plate 56 rotates the lateral forces generated by the letting out of the mooring cable 52 are dissipated so that any tendency to upset or rotate the device as a whole is minimized. The brakes 68 having been pre-set, the mooring device sinks at a rate that permits smooth and rapid paying-off of the mooring cable 52 without entanglement of the cable.

The mooring device continues to sink in this manner until the lower end of the anchor member 14 strikes the ocean floor. Upon impact the charge 32 detonates. The explosion of charge 32 drives the anchor member 14 into the ocean floor thereby unravelling the anchor cable 38 and anchoring the device to the ocean bottom. Simultaneously, the wire 94 is withdrawn from locking pin 88 which pin is thrust into locking engagement with one of the slots 86 of rotating locking disc 44. Immediately, the rotation of the disc 44, the core 54 and the rotating plate 56 is stopped thereby preventing further unwinding of mooring cable 52.

Referring generally to FIGS. 6–10, a second embodiment of the present invention comprises a main body member 100 including a cable storage reel 112, a rotatable plate or flyer 114 mounted above the storage reel, and an anchor member (not shown).

The main body member comprises a cylindrical weight portion 115 which is substantially solid, a plurality of stabilizing fins 116 vertically mounted by suitable means at regular intervals about the cylindrical surface of the weight portion 115, and anchor means 117 protruding from the bottom of the weight portion 117 (only the upper portion of the anchor means being shown).

The mooring cable storage reel 112 comprises a lower flange portion 121, a cylindrical portion 122 and an upper flange portion 123. The lower flange portion of the reel 112 is secured to the upper end of the weight portion 115 by any suitable means and is immovable with respect thereto. A mooring cable 124 is wrapped about the cylindrical portion 122 perhaps with a back twist as described in the previous embodiment.

A hollow shaft 131 is rotatably mounted in a central bore 132 of the cylindrical portion 122 of the mooring cable storage reel 112. The shaft 131 is journaled at either end of the bore 132 in bearings 133 and 134 and is provided with a collar 135 at its lower end to prevent axial movement.

The flyer 114 is secured to the shaft 131 and rotates therewith. It is provided with a cocking arm 138 and an eccentric arm 139 which have weighted heads 140 and 141 respectively. Both arms are mounted for pivotal movement in a plane parallel to that of the face of the flyer 114 about pins 143 and 144 respectively. The travel of the cocking arm 138 is determined by limit stops 145 and 146 and the travel of the eccentric arm 139 is determined by a biasing spring 147 one end of which is secured to the arm 139 and the other end of which is anchored to the limit stop 146. The head 140 of the cocking arm 138 is provided with a stud 148 and the head 141 of the eccentric arm 139 is provided with a small bore 149. As explained hereinafter, the head 141 of the eccentric arm and an opposite tail portion 139' constitute triggering and restraining means respectively. Locking means 150 is mounted vertically on the flyer 114 and comprises a support 151, a first locking element or pin 152, and a compression spring 153. The compression spring 153 biases the locking pin 152 in a downward direction by acting against both a portion of the support 151 and a flange portion 155 which is integrally formed on the locking pin 152. The locking pin 152, if released, will protrude through an opening in the flyer 114 and enter into a second locking element which is the flange portion 123 defining sockets 160 arranged circularly adjacent the lower surface of the flyer 114.

Further provided on the flyer plate 114 is a dynamic balance weight 161 and a cable guide 162. The cable guide 162 is a tube which extends upwardly through the periphery of the plate 114, then diagonally towards the shaft 131, through a cutout 163 in the shaft and finally vertically upwardly along the axis of the shaft 131, terminating at a flexible fitting 164. The guide 162 permits the mooring cable 124 to be drawn off the storage reel 120 in an axial direction and enables a rotary motion to be imparted to the flyer 114 as the mooring cable is so drawn off.

Figure 8:
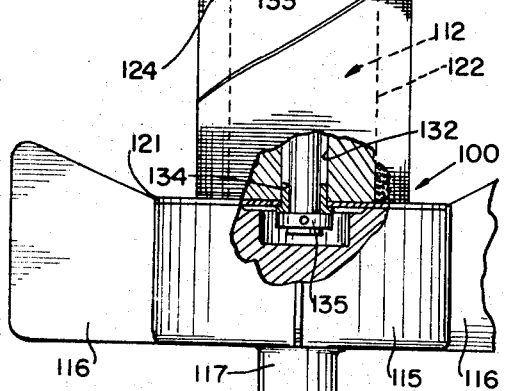
FIG. 8 is a plan view of the locking mechanism of the second embodiment, the solid lines showing the position of the elements before the device is released and the dotted lines showing the position of the elements during descent.
Figure 10:
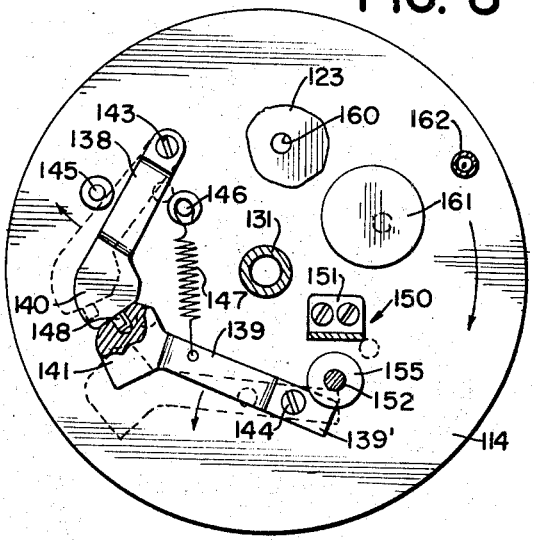
FIG. 10 is a section of the locking mechanism taken through line 10—10 of FIG. 9.
Figure 9:
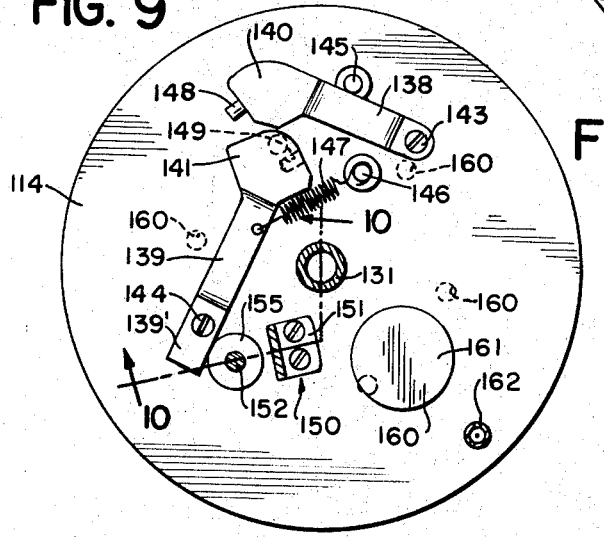
FIG. 9 is a plan view of the locking mechanism of the second embodiment showing the elements in locked position.

In operation, the full length of the mooring cable 124 is wound on the reel 112. The end of the cable is drawn through the guide 162 and extends beyond the fitting 164 where it is secured to a buoy or the like. To cock the locking mechanism, the locking pin 152 is raised and the arms 138 and 139 are positioned together so that the stud 148 enters the bore 149, as shown in FIG. 8 in solid lines. The engagement is such that the two arms may be separated only if they both swing radially outwardly about their respective pins 143 and 144. In this cocked position, the locking pin 152 may be released and still be maintained out of locking engagement with the bores 160. This is accomplished because the position of the eccentric arm 139 is such that the flange portion 155 of the locking pin 152 rests on the tail portion 139' of the eccentric arm 139.

When the device is dropped through the water or other medium, rotation is imparted to the flyer plate 114 by the mooring cable 124 as it pays out. Rotation of the main body portion 100 and the storage reel portion 112 is retarded by the fins 116. As the angular velocity of the flyer 114 increases, centrifugal force causes the head 140 and 141 of arms 138 and 139 respectively to swing radially outwardly as shown by the dotted lines in FIG. 8. The outward movement of the cocking arm 138 is limited by the stop 145 and the outward movement of the eccentric arm 139 is restrained by the spring 147. The dynamic balance of the system is maintained by the weight 161.

When the device impacts with the ocean bottom or the like, the anchor means 117 (perhaps similar to the anchor actuated by an explosive charge as in the previous embodiment) secures itself to the bottom in any suitable fashion. At the same time, the cable 124 ceases the pay out and the flyer 114 ceases to rotate. As the angular velocity of the flyer 114 diminishes, the centrifugal force on the arms 138 and 139 likewise diminishes to a point where the elastic force of the spring 147 overcomes the centrifugal force on the eccentric arm 139. At this point, the eccentric arm 139 is caused to pivot radially inwardly about its pin 144 to assume the position illustrated in FIG. 9. As the eccentric arm 139 so pivots, the tail portion 139' moves away from the locking mechanism 150 and thus out of supporting engagement with the flange portion 155 of the locking pin 152. The force of the compression spring 153 causes the locking pin 152 to traverse downwardly through the opening in the flyer 114 and into locking engagement with one of the plurality of sockets 160. The device is then secured to the ocean bottom and the flyer plate 114 is then locked against rotation, thereby effectively restraining the mooring cable 124.

It will be understood that the invention is not restricted to descent by gravity through air or water. The unique means for paying out and securing a cable which it embodies can serve as well where the device is pulled by a vehicle or projected through its path of travel and is locked without slackening the cable when its displacement ceases. Also, the end of the cable may be pulled out in the more common manner while the remainder of the device is stationary.

I claim:
1. A device for dispensing and securing a cable comprising
   (a) a main body portion;
   (b) a flyer rotatable on the body portion;
   (c) a reel fixed to the body portion coaxial with the flyer;
   (d) a length of cable wrapped about the reel to be paid out from the end of the reel through the flyer to impart rotation to the flyer;
   (e) locking means for preventing rotation of the flyer and pay out of the cable comprising
      (i) positively engageable first and second locking elements mounted on the flyer and body portion respectively and biased toward locked position,
      (ii) restraining means releasably holding said locking elements out of locked position, and
      (iii) triggering means for disabling said restraining means to release said locking elements into locked position and prevent rotation of the flyer.
2. A device according to claim 1 wherein the cable is dispensed by securing that end thereof first withdrawn through said flyer and moving the remainder of the device away from the secured end of the cable, said triggering means being operative to disable said restraining means in response to interruption in the movement of said remainder of the device away from the secured end of the cable.
3. A device according to claim 2 wherein said end of the cable is adapted to be secured on the surface of a body of water and the remainder of the device is adapted to be submerged downwardly therefrom, said device further comprising
   (i) anchor means depending from the body portion,
   (ii) said triggering means being operative to disable said restraining means in response to arrival of the remainder of the device at the bottom of the body of water.
4. A device according to claim 3 which includes
   (i) fin means on the body portion for maintaining the reel axis substantially vertical during submergence.
5. A device according to claim 3 wherein said locking elements comprise
   (i) a spring-biased pin and a member defining socket means in which said pin is positively engageable.
6. A device according to claim 1 which includes
   (i) braking means rotatable with the flyer for retarding rotation of the flyer with respect to the reel.
7. A device according to claim 3 wherein
   (i) said locking elements comprise a spring-biased pin on the body portion and a disc on the flyer defining sockets in which said pin is positively engageable,
   (ii) said restraining means releasably hold said spring-biased pin,
   (iii) said triggering means is operative to disable said restraining means in response to impact of the anchor means on the bottom of the body of water.
8. A device according to claim 3 wherein
   (i) the body portion is of bowl-shaped configuration having sides diverging upwardly during submergence.
9. A device according to claim 1 wherein
   (i) the first locking element on the flyer is biased toward the second locking element.
10. A device according to claim 9 wherein
   (i) said first locking element is a spring-biased pin, and
   (ii) the second locking element comprises a plurality of sockets in said body portion in which said pin is positively engageable.
11. A device according to claim 9 wherein said restraining and triggering means comprise
   (i) eccentric means mounted on said flyer for limited displacement with respect to the axis of rotation thereof, and
   (ii) biasing means acting upon said eccentric means,
   (iii) said eccentric means being urged by centrifugal force during rotation of the flyer into connected relation with said first locking element to hold said locking elements in unlocked position,
   (iv) said eccentric means being urged by said biasing means upon cessation of rotation of the flyer into disconnected relation with said first locking element to release said locking elements into locked position.
12. A device according to claim 11 wherein said triggering means further comprises.
   (i) cocking means for maintaining the eccentric means in connected relation with said first locking element when said flyer is not rotating and being urged by centrifugal force free of said eccentric means during rotation of the flyer.
13. A device according to claim 11 wherein said eccentric means comprises
   (i) a trigger arm pivoted intermediate its ends on said flyer at a point spaced from the axis of rotation of the flyer,
   (ii) one end of said trigger arm being weighted to pivot by centrifugal force during rotation of the flyer, and
   (iii) the other end of said trigger arm being engageable wtih and disengageable from said first locking element.
14. A device according to claim 13 wherein
   (i) said biasing means is a spring acting on said trigger arm to urge the weighted end thereof toward said reel axis.
15. A device according to claim 13 wherein said triggering means further comprises
   (i) a cocking arm pivoted on said flyer at a point spaced from the axis of rotation of the flyer,
   (ii) one end of said cocking arm being engageable with said trigger arm to maintain the trigger arm in engagement with said first locking element when the flyer is not rotating and being weighted to pivot free of said trigger arm by centrifugal force when said flyer rotates.

References Cited

UNITED STATES PATENTS

| | | | |
|---|---|---|---|
| 2,319,828 | 5/1943 | Rohweder | 242—128 |
| 3,054,123 | 9/1962 | Moeller | 114—206 X |
| 3,073,545 | 1/1963 | Frate et al. | 242—128 |
| 3,336,892 | 8/1967 | Barry et al. | 9—8 X |

MILTON BUCHLER, *Primary Examiner.*

T. MAJOR, *Assistant Examiner.*